June 28, 1960   W. S. PRAEG ET AL   2,942,389
GEAR FINISHING

Filed Aug. 29, 1957   2 Sheets-Sheet 1

INVENTORS
WALTER S. PRAEG
JOHN J. SIGMAN Jr.
BY
Whittemore, Hulbert
& Belknap
ATTORNEYS June 28, 1960  W. S. PRAEG ET AL  2,942,389
GEAR FINISHING
Filed Aug. 29, 1957  2 Sheets-Sheet 2

INVENTORS
WALTER S. PRAEG
JOHN J. SIGMAN Jr.
BY
ATTORNEYS

United States Patent Office 2,942,389
Patented June 28, 1960

2,942,389
GEAR FINISHING

Walter S. Praeg and John J. Sigman, Jr., Detroit, Mich., assignors to National Broach & Machine Company, Detroit, Mich., a corporation of Michigan Filed Aug. 29, 1957, Ser. No. 680,982

3 Claims. (Cl. 51—287)

The present invention relates to gear finishing.

The present application is a continuation-in-part of applicants' prior copending application Serial No. 558,043, fined January 9, 1956, now abandoned.

In recent years processes and equipment relating to the production of highly accurate gears have reached a point of refinement where high quality in a finished gear is demanded as a matter of course. Gears are subjected to very strict tests some of which have no real bearing on the actual strength and utility of the gears. For example, automotive transmission gears are usually subjected to sound testing to determine the quietness of the gears when operated under anticipated service conditions.

The manufacture of gears divides itself naturally into the production of gears from blanks and the finishing of previously cut gears. In the first category are gear hobbing and gear shaping. Both of these operations have been refined to the point where gears sufficiently accurate for some conditions are obtainable without finishing.

However, for high quality gears further finishing operations are necessary. In this category the most widely accepted method of finishing previously rough cut gears is gear shaving. In this operation a gear-like tool provided with cutting edges extending up and down the sides of its teeth is run in mesh at crossed axes with a previously cut gear while relative traverse is effected to extend the finishing action of the tool from end to end of the gear teeth. In general, this operation may be carried out effectively only in rough cut gears prior to heat treatment.

Heat treatment as carried out under the controlled conditions prevailing today produces some distortion of the gear teeth but this distortion in general is predictable and is taken into account in the shaving of the gears prior to heat treatment. If an accurate prediction as to the amount of distortion resulting from heat treatment has been made, it is possible to produce gears which after heat treatment are acceptable for use. On the other hand, a number of factors which are not ordinarily controllable in commercial production may enter into the distortion of gears in heat treatment. It also happens that even under carefully controlled production conditions, errors may develop in shaved gears prior to heat treatment and not be detected until the hardened gears are sound tested after heat treatment.

Prior to the present invention certain expensive gears which were rejected as scrap as a result of sound testing or other testing after heat treatment have been salvaged by lapping the hardened gears. In general it is of course impossible to shave the hardened gears since the heat treatment operation makes them too hard to shave. The lapping operation as it has been known for many years comprises running the gear in mesh with a lap which has almost invariably been formed of cast iron. In order that the lapping operation shall remove material from the teeth of the gear, a lapping compound is provided to lie between the engaged teeth of the gear and lap. In general, lapping operations have been carried out by driving the gear or lap directly and letting the other member be driven against a brake or other resistance by the meshed engagement between the parts. Alternatively, in some cases the gear and lap are moved in radial approach into a cramped condition, thus establishing the requisite lapping pressure between the teeth of the gear and lap. In either case, very unsatisfactory results have been obtained for a number of reasons. In the first place, the operation depends for any effectiveness whatever upon the presence of lapping compound between the supposedly engaged surfaces of the teeth of the gear and lap. This lapping compound is in the form of a paste or mud of substantial thickness carrying abrasive particles. In theory, the abrasive particles embed themselves to some extent in the surface of the teeth of the cast iron lap and are dragged thereby across the surface of the gear teeth, thus removing material from the surface of the gear teeth. In practice however, it is found that the action of the abrasive particles is about as effective to remove material from the lap as it is to remove material from the teeth of the gear.

Since the lapping operation depends for its success upon the presence of substantial quantities of material between the teeth of the gear and lap, it clearly cannot be expected to remove very minor surface imperfections having dimensions comparable with the abrasive particles of the lapping compound.

A very important disadvantage of lapping as an operation is that if it is attempted to correct a consistent error in a series of gears, the lap quickly wears to conform itself to these errors. In other words, the lap is completely ineffective to correct a series of gears having the same errors in the gear teeth.

Several years ago one of the inventors herein attempted to correct errors in hardened gears by forming gear teeth in the periphery of grinding wheels of different types. These efforts were uniformly unsuccessful due to the fact that the material of the tool was brittle and the teeth when subjected to impacts and forces developed in the operation, quickly crumbled and whole teeth were fractured out of the tool.

Accordingly, it is an object of the present invention to provide a method of finishing gears which is suitable for removing imperfections and correcting certain errors in steel gears after they have been subjected to heat treatment.

It is a further object of the present invention to provide a method of finishing gears which comprises running them in mesh at relatively high speed and at crossed axes with a special tool, characterized in that at least the surface portions of its teeth are formed of a hard yet resilient plastic material having abrasive particles permanently embedded in the surface portions thereof to appreciable depth.

Other objects and features of the invention will become apparent as the description proceeds, especially when taken in conjunction with the acompanying drawings, illustrating preferred embodiments of the invention, wherein.

Figure 1:
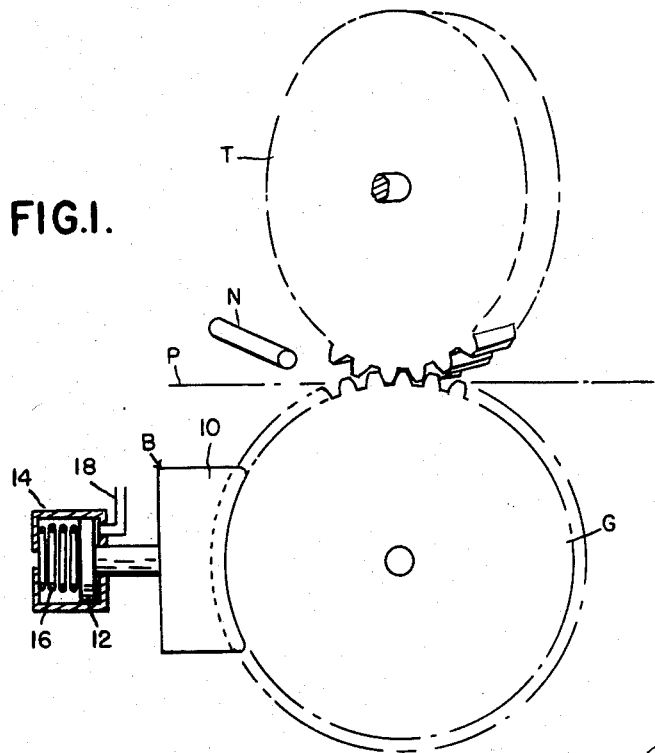
Figure 1 is a diagrammatic view illustrating the present operation.

It has now been found that hard gears may be finished by an operation which depends for its success upon the use of a special hard gear finishing tool. This tool is in the form of a gear and has at least the surface portions of its teeth formed of a strong resilient material, such for example as an epoxy resin, having a multiplicity of abrasive particles embedded in the material of the teeth, some of which appears at the surfaces thereof. Thus, these embedded abrasive particles appearing at the surfaces of the teeth are surrounded by the resin and are therefore separated from each other. The tool therefore is characterized in that the teeth thereof are formed of solid plastic or resin compound in which separated abrasive particles are surrounded and embedded. Unlike grinding wheels, it does not include voids. This tool is not subject to the crumbling and fracture which took place when it was attempted to produce a similar tool from materials effective in grinding wheels. Neither is the tool subject to the objection of laps that the material of the tool is eroded at a rate comparable to the rate of erosion of the gear. Extended tests indicate an amazing and unexpected life in the tool.

The material from which the tooth portions of the honing tool are formed is a solid resin compound in which abrasive particles are embedded and surrounded, some of the particles being exposed in the tooth surfaces of the hone.

It is essential that the plastic compound employed be quite hard so as to retain a tooth form with a high degree of accuracy. At the same time, the resin compound must be slightly yieldable to permit portions thereof and abrasive particles carried thereby to yield slightly when subjected to heavy stresses during a honing operation. This property of slight yieldability must of course be accompanied by substantially perfect resilience so that the deflected surface portion of the teeth will return to its initial position as soon as the stress is relieved. The material also must be capable of casting in an inexpensive process to make it commercially suitable. For this purpose a resin compound characterized by very great dimensional stability is required.

At the present time the only material which has been found to answer all of the requirements is an epoxy resin. This material is compounded so that the finished hone has a hardness from between 40 below to 90 above zero on the Rockwell M scale.

The abrasive particles embedded in the hone may be any of the suitable abrasive grains but excellent results have been obtained when the grain is silicon carbide. The size of the grain varies in accordance with requirements. If a honing operation is employed to produce an extremely smooth surface finish, obviously relatively smaller grains will be employed. It has been found that a surface finish of from three to five micro inches may be produced with a hone having abrasive particles of approximately 280 grit. On the other hand, for ordinary honing excellent results have been obtained employing abrasive grains of 60 grit particle size. Another factor which influences the size of the abrasive particles is the tooth dimensions. When the hone is of rather fine pitch, it is desirable to employ finer grit abrasive to increase the strength of the material.

A resin compound which has proven entirely satisfactory in extended commercial production is given below where the parts referred to are by weight.

*Resin compound*

| Material: | Parts by weight |
| --- | --- |
| Epoxy resin | 100 |
| Abrasive filler, 325 grit, silicon carbide | 25–100 |
| Glass fibers, 1/32 inch | 10– 30 |

This material is purchased from Marblette Corporation under their identifying number of 1270A. This resin is mixed with abrasive particles and the mixture is then cast in an accurately formed mold and subjected to elevated temperatures as for example 180 degrees, to cure the compound.

Just prior to pouring the mixture, the resin compound is mixed with abrasive such for example as silicon carbide particles having a grit size of from 46 to 280. Excellent results are attained when 100 parts of the resin compound are thoroughly mixed with 100–150 parts of the silicon carbide abrasive. Within this range, the resin and grains form a dense, solid material characterized by substantially no voids therein, the grains being essentially separated and embedded in and surrounded by the resin matrix. At this time a catalyst or hardener is added to the mixture, preferably between 15 and 20 parts per 100 parts by weight of the resin compound. This hardener is a conventional hardener for use in conjunction with epoxy resin, as for example an aliphatic-amine or poly-amine.

The gear finishing tool employed herein is designed to be conjugate to the hard gear to be finished and to mesh therewith with the axes of the gear and tool parallel to a common reference plane and crossed at an angle determined by the difference in helix angles of the teeth of the gear and hard gear finishing tool. In general, best results are obtained when the crossed axes angle is between 10 and 30 degrees, and is preferably at least 15 degrees. However, in the case of shoulder gears where such high crossed axes are not attainable, effective results have been obtained when the crossed axes angle is as low as 3 degrees. This crossed axes angle is to be compared with the crossed axes angle currently employed in gearing shaving which is between 5 and 15 degrees. It is further to be compared to the crossed axes conventionally employed in lapping which is between 3 and 10 degrees.

The operation is carried out with the parts as illustrated in Figure 1. Thus for example, a hard gear finishing tool is indicated at T in Figure 1 and has its teeth therein conjugate to the teeth of a hardened gear G. The teeth of the gear and tool extend at different helix angles so that the axes of the gear and tool are crossed in space at an angle which is preferably between 10 and 30 degrees and not less than 15 degrees, but which may be as low as 3 degrees or less where special restrictions such as shoulders require.

In the operation, due to the crossed axes relationship, the peripheral portions of the gear and tool are closest together in a zone determined by a line perpendicular to the axes of the gear and tool, this line being referred to herein as the common normal to the axes. In the present operation the gear and tool are normally operated in a condition other than tight mesh. In practice, the gear and tool are adjusted radially towards each other into very light contact and thereafter may be locked in that position of radial adjustment. Thereafter, one of the members, ordinarily the tool, is driven positively in rotation thereby driving the gear. In order to develop the required pressure contact between the teeth of the tool and the teeth of the gear suitable brake means such as indicated generally at B are provided. In any case, the required pressure between the surfaces of the teeth of the tool and gear are developed by resistance to rotation of the driven member. Thus for example, if the work gear is a small diameter pinion, its resistance to rotation may be sufficient to develop the required working pressure without the use of special and separate brake means.

If the parts are rotated in mesh without relative traverse, and if the teeth of the tool are unmodified, the action of the tool will be to produce a hollow lead modification in the teeth of the gear. This modification results in teeth which are of diminishing thickness toward the center from either end thereof. In order to prevent the development of this hollow lead modification a relative traverse is provided between the teeth of the gear and tool. This traverse may take place in the direction of the axis of the gear or it may take place in a direction oblique to the axes of the gear and tool.

The present invention is explained in connection with cylindrical (that is, either spur or helical) gears, and as seen in the figures it will be appreciated that the axes of both the tool and gear are horizontal and both are parallel to a reference plane shown in broken lines and designated P. The relative traverse between the tool and gear is in a direction parallel to the reference plane P and either parallel to the axis of the gear G or oblique thereto, so long as it is not parallel or approximately parallel to the axis of the hard gear finishing tool T.

Inasmuch as the finishing action of the tool T is the result of brake pressure applied to the gear G, or resistance to rotation is developed by other means, it will of course be necessary to reverse the direction of rotation during reverse traverse or during a second back and forth traverse stroke so as to finish both sides of the teeth of the gear G.

The present operation is carried out with the hard gear finishing tool and gear operated to have a pitch line velocity of between 250 to 1000 feet per minute. The relative traverse between the hone and gear is very slow, as for example about 2.5 to 12 inches per minute and is to be regarded as a feeding motion for distributing the action of the hone longitudinally from end to end of the teeth of the gear. The honing or abrading action is thus due to the rolling in mesh, and not to traverse between the gear and hone.

It will of course be appreciated that when the speed of rotation is referred to in terms of surface speed, reference is made to pitch line velocity. This however, does not mean that the engaging surface portions of the teeth of the hard gear finishing tool and gear have a relative speed at all comparable to the nominal surface speed of the parts. Actually, the engaged teeth of the hard gear finishing tool and gear have relative sliding motion which decreases from a maximum from initial contact to contact in a zone adjacent the line joining the centers of the gear and tool, and thereafter increases again throughout the zone of separation.

Referring again to the figures, the brake B is illustrated as comprising a brake block or shoe 10 connected to a piston 12 slidable in a cylinder 14 and urged against the periphery of the work gear by a compression spring 16. A fluid pressure line 18 is provided and when fluid under pressure is admitted to the cylinder through the line 18 the brake block 10 is withdrawn from the periphery of the gear G. Obviously of course, other mechanical or electrical means may be used to control the application and release of the brake pressure.

The brake block 10 is preferably formed of the same or a similar material as the tooth portions of the tool T and like such material, contains abrasive particles which are exposed in its surface. Accordingly, the brake block 10 not only performs the function of applying a resistance to rotation of the gear G and thus develops the required pressure between the teeth of the tool T and the gear G, but also serves to finish and remove burrs from the tops of the teeth of the gear G.

While the teeth of the tool T are quite strong and may be suitably reinforced if desired as shown in the prior copending Sigman and Praeg application Serial No. 543,704, now abandoned, it is nevertheless desirable to relieve the teeth of unnecessary stresses. Accordingly, it is desirable to permit the tool T and gear G to come to operating speed or to at least approach operating speed before the application of the brake. In like manner, it may be desirable to remove the brake prior to discontinuing drive of the tool T. This is accomplished by the control of fluid pressure through the supply line 18 to the cylinder 14.

The hard gear finishing operation as described herein is performed in the presence of a coolant which is supplied to the finishing zone through a nozzle N. This coolant may be kerosene, honing oil, a water and oil soluble solution, or in some cases water. It serves the dual function of preventing instantaneous localized overheating as a result of the hard gear finishing operation and also serves to carry the particles removed by the finishing tool away from the finishing zone.

Figure 2:
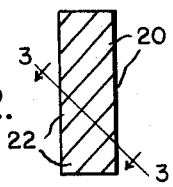
Figure 2 is an elevational view of a brake shoe employed in the present invention.
Figure 3:
Figure 3 is a sectional view on the line 3—3, Figure 2.

In some cases excessive heat may tend to develop between the surface of the brake shoe 10 and the gear G. This may generally be controlled by relieving portions of the surface of the brake shoe. Thus, as shown in Figures 2 and 3, the brake shoe may have diagonally extending channels 20 leaving upstanding ribs 22 therebetween. This reduces the area of contact and breaks up the heating effect into a series of actions interrupted as a particle of the gear moves across a channel or groove 20. In addition, the coolant may flow through the diagonally extending channels and if desired, a branch of the nozzle N may be more directly pointed toward the brake shoe 10.

In the foregoing disclosure, the gear and tool were described as operated with their axes crossed so as to develop a rubbing action between the surfaces of the teeth having a component parallel to the axis of the gear. If the axes of a gear and tool are parallel, it will be appreciated that rubbing action is theoretically zero at the operating pitch line of the parts. Thus, in order to produce a finishing action which is more or less uniform and which includes the removal of metal at and adjacent the pitch line of the gear, it is desirable, when the gear and tool are of the cylindrical (spur or helical) type, to select a helix angle for the teeth of the tool which requires mating with the gear at crossed axes. However, in some cases the problem is not to remove material throughout the entire surface of the gear teeth, but instead, only to remove imperfections such for example as nicks resulting from rough handling. In such case the gear and tool may be operated on parallel axes and rotated together for a period only sufficient to remove imperfections such as nicks, without attempting to remove or clean up material from the entire surface of the gear teeth.

In the operation described above, the parts may be rotated without relative traverse but in general it is desirable to provide relative traverse and in this case the traverse would normally be parallel to the axis of the gear. This distributes action longitudinally of both the teeth of the tool and gear.

While the present invention has been described as of particular value in finishing gears after heat treat, it is of course also useful in finishing steel gears in the green and cast iron gears after hobbing and shaping. Cast iron gears in particular, have offered difficulties since in shaving such gears, abrasion occurs which shortens the life of a cutter. It is found that cast iron gears may be finished by the present method with a much increased tool life.

Figure 4:
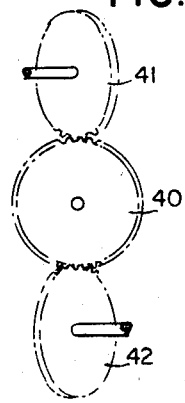
Figure 4 is a diagrammatic view showing the use of two gear-like members in mesh with a work gear.

Referring now to Figure 4, there is illustrated an arrangement in which a work gear 40 is in mesh with two gear-like members 41 and 42. As illustrated in this figure, the members 41 and 42 are of such helix angle as to require their axes to be crossed with the axis of the gear 40 when in mesh therewith.

In accordance with one embodiment of the invention, the gear-like member 41 may be a gear finishing tool of the type disclosed herein and may operate exactly like the tool T shown in Figure 1. The gear-like member 42 may in this case be a gear the purpose of which is to oppose rotation of the work gear 40. Thus, the rotation of the gear-like member 42 may be opposed by suitable means, either inherent friction or by separate brake means as disclosed. In this case the gear finishing tool 41 will finish one side of the teeth of the gear 42 during rotation in one direction and the direction of rotation will be reversed to finish the opposite side of the gear teeth.

When the gear-like member 42 is a steel gear provided for the primary purpose of opposing rotation of the work gear 40, a second advantage may be obtained. A principal use of the present method is improving the running characteristics of the work gear, and to determine the improvement of the work gear it is standard practice today to run the gear in mesh with a mating gear and to observe the sound of the running gears. Nicks or other imperfections in the gears cause substantial noise which is an indication that the gear is not suitable for use. With the parts as illustrated in Figure 4, the work gear 40 is running in mesh with the steel gear 42 at substantial speeds at the same time as its teeth are being finished by mating with the teeth of the gear finishing tool 41. The engagement between the teeth of the work gear 40 and the gear 42 will result in sounds indicating the condition of the gear 40. Thus for example, if the gear 40 has one or more nicks on its teeth which are to be removed by the tool 41, these nicks when engaging the teeth of the gear 42 will produce a noticeable noise. As the nicks are removed by the action of the tool 41, this noise will be reduced and eventually eliminated. Thus, the invention may combine sound testing and correction at the same time, the correction being carried out only to the extent necessary to eliminate objectional sound.

The present invention has been illustrated as carried out with a gear finishing tool in the form of an external gear cooperating with a work piece in the form of an external gear. This specific relation is not intended to be limiting and of course the present invention may be practiced in an operation in which the teeth of an external gear are finished by meshing engagement with the teeth of a tool in the form of an internally toothed gear member. At the same time, the present invention is applicable to the finishing of the teeth of an internal gear by meshed engagement with a gear finishing tool in the form of an externally toothed gear.

In accordance with a second embodiment of the invention, also illustrated in Figure 4, both the gear-like members 41 and 42 may be gear finishing tools of the type disclosed herein. In this case one of the tools such for example as 41, may be positively driven and will drive the gear 40 and the tool 42 through the meshed relationship of the parts. In this case the gear 40 will be mounted for free rotation and the working pressure may be developed by opposing rotation of the tool 42. Relative traverse, as described in conjunction with Figure 1, will normally be provided and in this case may conveniently take place in a direction parallel to the axis of the gear 40. This method has the advantage that both sides of the teeth of the gear 40 may be finished simultaneously and with substantial uniformity.

Figure 5:
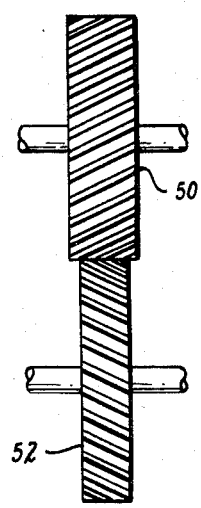
Figures 5–8 are diagrammatic views showing the meshing relationship between a gear-like tool and gear member of different types.

The detailed description so far has related to the finishing of one external cylindrical gear with another and the illustration in Figures 1 and 4 has been of gears and tools having teeth so related as to require meshing at crossed axes. However, the operation is capable of being carried out on parallel axes and such a relationship is illustrated in Figure 5 where a helical gear finishing tool 50 is shown in mesh with a relatively narrow work gear 52, the teeth of which are of equal helix angle and opposite hand to the teeth of the tool 50. Accordingly, the tool 50 and gear 52 mesh with their axes parallel.

Figure 6:
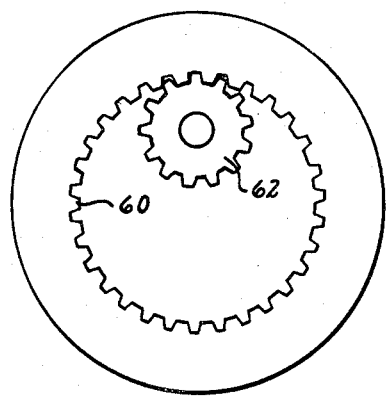

Referring now to Figure 6 there is illustrated an arrangement in which one of the parts, either the gear or tool, is in the form of an internal gear 60 and the other part is in the form of a pinion 62 the teeth of which mesh with the teeth of the internal gear-like part 60. It will be appreciated that in this case, as in the case of the external gears previously described, the helix angle of the teeth may be such as to produce meshing engagement with the axes of the members parallel or inclined.

Figure 7:
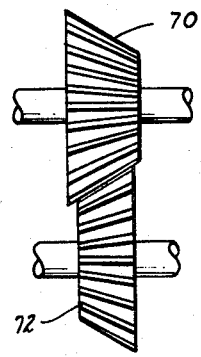

Referring now to Figure 7 there is diagrammatically illustrated the application of the present invention to the finishing of bevel gears. In this case a bevel gear-like finishing tool 70 is shown in mesh with a bevel work gear 72. In the illustrated arrangement the teeth of the tool and work gear are designed to produce meshing engagement with the axes of the members parallel but this relationship is not essential and the axes of the bevel gears may be non-parallel.

Figure 8:
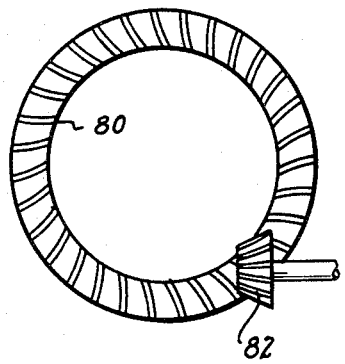

In Figure 8 there is illustrated the relationship between hypoid members 80 and 82. In this case either of the members 80 or 82 may be the gear finishing tool and the other member will be the work piece.

The present operation has proved itself primarily successful in operating on hardened gears, which through improper shaving techniques or through distortion in heat treatment, have proved unacceptable in final tests, such for example as sound tests. Actually, the present operation appears to remove a small amount of material from the teeth of the finished work gear in a very brief interval. However, continuing the operation for a substantial period after removal of the first few ten thousandths of an inch as measured over pins, does not appear to remove further substantial amounts of material. This is explained in that the present operation not only serves to remove nicks and such imperfections, but also improves the surface finish. A shaved gear after heat treat may have a surface finish of about 45 to 120 microinches. The present operation has in specific tests, improved the surface finish to about 20 microinches and in other cases finishes of 6 or 7 microinches have been established. This improvement in surface finish without other change would result in an appreciable nominal stock removal. Of course, if continued for substantial periods and under substantial brake action, or in some cases cramp action, substantial quantities of stock can be removed and severe errors corrected.

While the present invention has been described as particularly useful in an operation such as the salvaging of gears, it is found to improve the sound characteristics of gears to such a degree that it justifies adoption as a final finishing operation on all heat treated gears, particularly critical gears in automotive transmissions. At the present time such gears are sound tested and expensive gears have been salvaged in some cases by individual hand operation with hand tools, or in other operations as by lapping as described above. Both operations are unsatisfactory and expensive and at best, do nothing to improve the salvaged gear over the general run of accepted gears. On the other hand, the hard gear finishing operation as disclosed herein improves the surface finish of the gears, effectively removes nicks and other minor imperfections, and finally, is effective to correct errors in tooth forms, even though such errors are consistent. In other words, the present operation does not result in the gear finishing tool conforming itself to a consistent error in a series of gears. Instead, for a sufficient life to render it economically useful, the hard gear finishing tool maintains its form and corrects the gear errors.

While the foregoing description has been limited generally to the use of brake action or resistance to rotation in finishing the teeth of hard gears, it will be appreciated that this action is not ordinarily successful in correcting eccentricity in a gear. Under these circumstances it is possible to correct eccentricity, spacing, lead and taper by cramping action resulting from radial approach between the gear and tool into tight mesh. Obviously, radial infeed must be carefully controlled in this as in any other gear finishing operation to avoid damage to or breakage of the teeth of the tool.

Evidently the totally unexpected efficiency of the present method is due to the use of a gear-like tool having sufficient hardness to resist yielding with a force effective to machine the material of the gear yet sufficiently yieldable to limit the pressure and to yield so as to avoid damage to the tool. At the same time it exhibits nearly perfect resilience and a displaced element of a tool tooth returns to its initial position after each displacement.

The tools exhibit the property of retaining form without development of errors due to wear for an unexpectedly long life. A tool life many times that of lapping tools, and retention of form without modification due to wear has been found.

The long life and seemingly practical imperviousness to wear is apparently due to the fact that each abrasive particle is yieldingly yet firmly mounted in the tooth surface. It thus cuts freely to its capacity, and when its capacity is exceeded, it yields due to its resilient mounting.

While the present disclosure of a preferred embodiment of the invention is of finishing cylindrical gears with a cylindrical tool, it will be apparent that the present invention is applicable to other gears such as bevel, spiral bevel, hypoid, conical, etc. In fact, the use in finishing hypoid gears is simplified because of the sliding action inherent between the surfaces of mating teeth in hypoid sets.

While reference has been made in the foregoing to the fact that the material of the hone is essentially a solid resin compound having the abrasive particles embedded therein, it is recognized that in mixing the abrasive particles with the resin compound while the resin compound is in liquid phase, it is impossible to avoid the introduction of some bubbles into the mixture. The mixing operation is carried out with extreme care, preferably under a substantial vacuum, to minimize and so far as possible eliminate the presence of bubbles in the finished material. Accordingly, where the resin compound is defined as solid, it will be understood that it encompasses a material which is essentially solid even though some air bubbles may be included.

The use of epoxy resin in the resin compound has the additional advantage that epoxy resin exhibits extremely high adhesive properties with respect to the abrasive grains. Thus, a grain which is partly exposed and partly surrounded by the resin compound, is supported not only by the mechanical action of the resin in surrounding it, but also by adhesion existing between the interfaces of the resin compound and abrasive grain.

The drawings and the foregoing specification constitute a description of the improved gear finishing in such full, clear, concise and exact terms as to enable any person skilled in the art to practice the invention, the scope of which is indicated by the appended claims.

What we claim as our invention is:

1. The method of finishing a steel work gear member after hardening which comprises placing it in mesh with a hone gear member conjugate to the work gear member, with the axes of said gear members crossed at an angle of between three degrees and thirty degrees, establishing and maintaining honing pressure between the teeth of the work gear member and the teeth of the hone gear member, driving one of said members in rotation at speeds between 250 and 1000 feet per minute pitch line velocity, supporting the other of said members for rotation to be driven in rotation by the meshed engagement between said members, effecting a very slow relative feeding traverse between said members during meshed rotation thereof in a direction which occupies a plane parallel to the axes of both of said members, said hone gear member having teeth at least the surface portions of which are formed of a relatively hard, slightly yieldable, highly resilient, substantially solid resin having a multiplicity of abrasive particles embedded therein.

2. The method as defined in claim 1 which comprises the step of opposing rotation of the driven member to establish and maintain the honing pressure as aforesaid.

3. The method as defined in claim 1 which comprises the step of effecting relative radial approach between said work gear member and said hone gear member into tight mesh to produce a cramping action for establishing the honing pressure as aforesaid.

References Cited in the file of this patent

UNITED STATES PATENTS

| | | |
|---|---|---|
| 1,989,650 | Drummond | Jan. 29, 1935 |
| 1,989,651 | Drummond | Jan. 29, 1935 |
| 2,105,896 | Stubbs | Jan. 18, 1938 |
| 2,165,386 | Klomp | July 11, 1939 |
| 2,351,842 | Seibold | June 20, 1944 |

FOREIGN PATENTS

| | | |
|---|---|---|
| 391,058 | Great Britain | Apr. 20, 1933 |